United States Patent [19]

Yagishita

[11] Patent Number: 4,919,806
[45] Date of Patent: Apr. 24, 1990

[54] CROSS-FLOW TYPE FILTER SYSTEM
[75] Inventor: Aisaburo Yagishita, Aichi, Japan
[73] Assignee: Goshi Kaisha Yagishita, Aichi, Japan
[21] Appl. No.: 235,503
[22] Filed: Aug. 24, 1988
[30] Foreign Application Priority Data Aug. 28, 1987 [JP] Japan ............................ 62-213098

[51] Int. Cl.$^5$ ............................................. B01D 25/38
[52] U.S. Cl. .................................. 210/334; 210/347; 210/414; 210/433.1
[58] Field of Search ............... 210/225, 332, 334, 346, 210/347, 413, 414, 433.1

[56] References Cited

U.S. PATENT DOCUMENTS

| | | | |
|---|---|---|---|
| 3,884,805 | 5/1975 | Bagarsarin et al. | 210/334 |
| 3,984,317 | 10/1976 | Donovan | 210/334 |
| 3,989,629 | 11/1976 | Donovan | 210/413 |
| 4,036,759 | 7/1977 | Donovan | 210/413 |
| 4,066,546 | 1/1978 | Sasaki | 210/332 |

FOREIGN PATENT DOCUMENTS 1356496 2/1964 France .
53-145160 12/1978 Japan .
55-49891 12/1980 Japan .
59-230613 12/1984 Japan .

OTHER PUBLICATIONS

Translation of French Patent No. 1,356,496.

Primary Examiner—Peter Hruskoci
Assistant Examiner—Christopher Upton
Attorney, Agent, or Firm—Lowe, Price, Leblanc, Becker & Shur

[57] ABSTRACT

A cross-flow type filter system includes a filter body divided into an inner primary chamber and an outer secondary chamber by a partition for fixing a plurality of flat filter media in parallel with each other, a rotor located within said primary chamber and adjacent to the surfaces of said filter media. The rotor is rotatable about a shaft extending therethrough and vertical with respect to the surfaces of the media, and allowes a liquid to flow in a direction parallel with the shaft. The system also includes a feed inlet passage provided to the primary chamber at a position adjacent to the shaft, a feed inlet passage located at a position around and adjacent to the media, and a filtrate outlet passage provided to the secondary chamber.

4 Claims, 3 Drawing Sheets

CROSS-FLOW TYPE FILTER SYSTEM

BACKGROUND OF THE INVENTION

1. Field of the Invention

The present invention relates to a filter system for recovering from a suspension a refined liquid freed of solid matters, etc. and obtaining a concentrated suspension.

2. Prior Art

Cross-flow type filters are often used to obtain refined filtrates by filtering large amounts of liquid feeds containing a relatively small amount of suspended matters. Such cross-flow type filters have been designed to be continuously operable over an extended period without a build-up of filter cakes on the surface of a filter medium by making the rate of a liquid feed flowing parallel with that surface higher than the rate of a filtrate passing through that filter medium. Usually, a cylindrical filter medium has been used so as to achieve a uniform and high-rate flow of a liquid feed.

However, the cross-flow filter using such a cylindrical filter medium has posed problems that if the area of the filter medium is increased so as to obtain an increased filter capacity, on the one hand, then it is required to increase the diameter or length of the filter medium and supply a large amount of a liquid feed, and if it is intended to obtain an increased filter capacity without increasing or decreasing the flow rate or speed of a liquid feed, on the other hand, then it is required to use a number of filter media each having a small diameter, thus resulting in the structure being complicated and increased in size. Another problem has been that the feed pump used is required to be of high pressure and large capacity.

SUMMARY OF THE INVENTION

A main object of the present invention is to provide a novel cross-flow type filter system which provides a solution to the problems of the conventional cross-flow type filters, and can be operated with any desired filter capacity and avoid disadvantages such as an increase in the size of equipment inclusive of a feed pump.

According to the present invention, this object is achieved by the provision of a cross-flow type filter system including in combination:

a filter body divided into an inner primary chamber and an outer secondary chamber by a partition for fixing a plurality of flat filter media in parallel with each other;

a rotor located within said primary chamber and adjacent to the surfaces of said filter media, said rotor being rotatable about a shaft extending therethrough and vertical with respect to the surfaces of said media and allowing a liquid to flow in a direction parallel with said shaft; a feed inlet passage located at a position adjacent to said shaft and a feed outlet passage located at a position around and adjacent to said media, both of which being provided to said primary chamber; and a filtrate outlet passage provided to said secondary chamber.

BRIEF DESCRIPTION OF THE DRAWINGS

The cross-flow type filter system of the present invention will now be explained with reference to specific embodiments illustrated in the accompanying drawings, which are given for the purpose of illustration alone, and in which.

EXPLANATION OF THE SPECIFIC EMBODIMENT

Figure 1A:
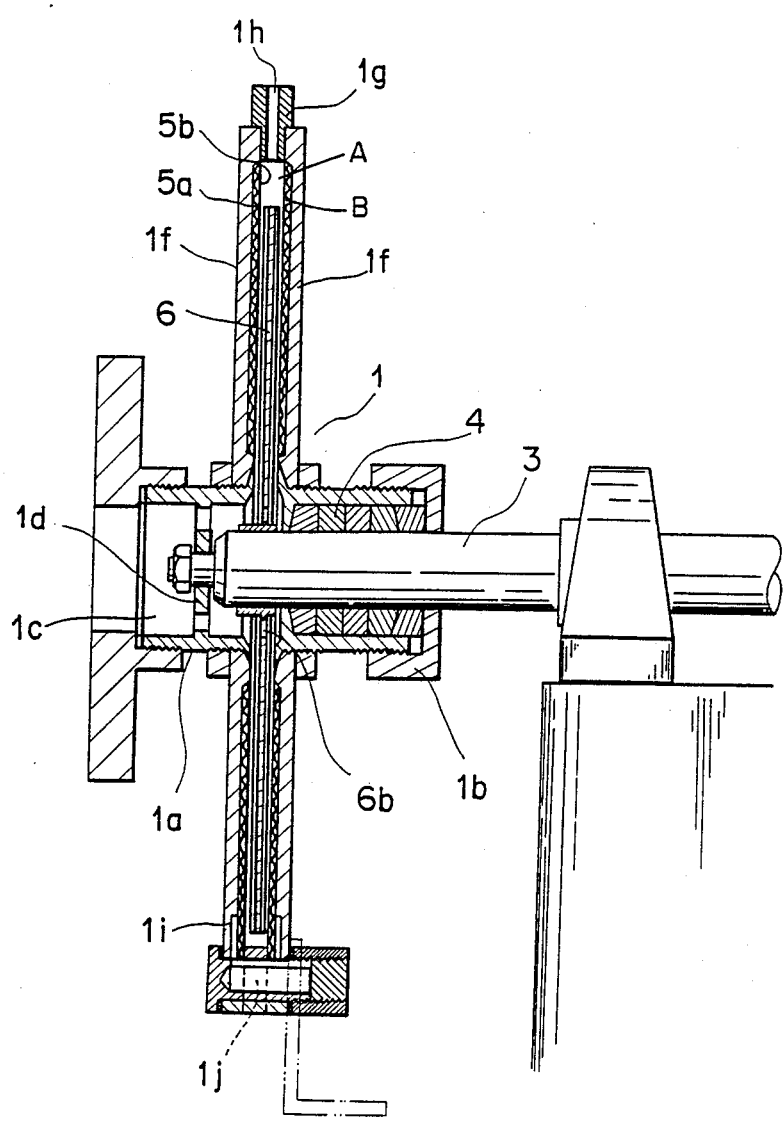
FIG. 1 shows one embodiment of the cross-flow type filter system according to the present invention, FIG. 1a being a longitudinally sectioned view, and FIG. 1b being a cross-sectional view.
Figure 1B:
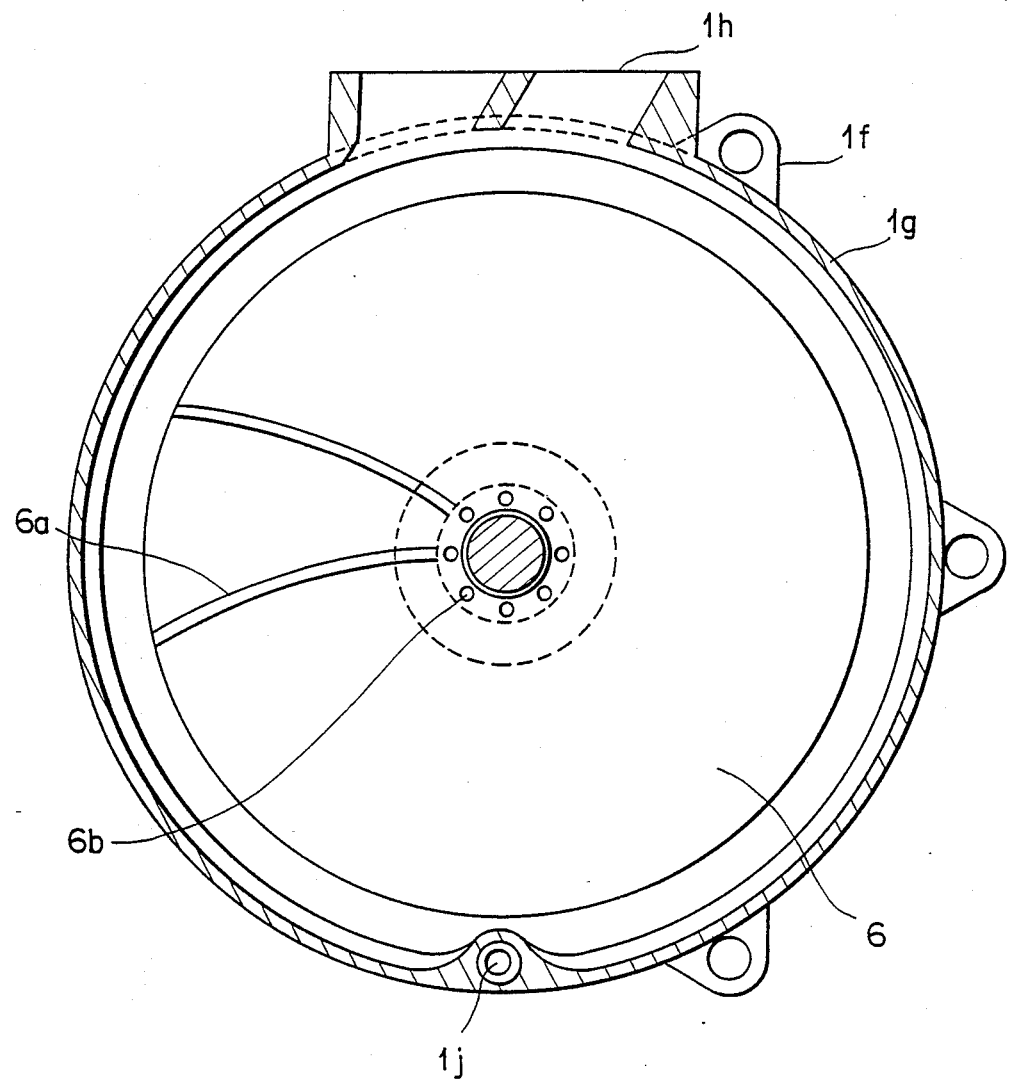

Referring now to FIG. 1, a filter body or main generally shown at 1 comprises a combination of a cylindrical member 1a with a disk-like wall member 1f. The cylindrical member 1a is provided at one end with a seal box portion 1b for receiving a sealing member 4 for a rotary shaft 3 which extends therethrough, and defines at the other end a feed inlet passage 1c. It is noted that 1d stands for a bearng portion. On the other hand, the wall member 1f is provided on its inside with a recess for receiving a porous support member 5a and, further, with flat filter media 5b contiguous to the support member 5a. The wall members 1f and 1f are connected with the cylindrical member 1a in such a manner that the filter media 5b and 5b are opposite to each other, and the peripheries of the wall member 1f are connected with each other by way of an annular member 1g. A space thus defined between the filter media 5b and 5b forms a primary chamber A which communicates at its central portion with an interior space of the cylindrical member 1a, and also communicates at its peripheral portion with a liquid outlet passage 1h located in the annular member 1g.

A spaced recessed in the wall member 1f for receiving the support member 5a defines a secondary chamber B in communication with a space 1j extending through the wall member 1f and annular member 1g via a filtrate outlet passage 1i formed therearound.

Within the primary chamber A, there is located a rotor 6 fixed to a rotary shaft 3, which is rotatable at a given position adjacent to the media 5b. Such a rotor 6 may be in the form of a disk plate. In this case, however, it is preferred that it be provided in or on its surface with radial, involute or spiral grooves or ribs 6a, and it is required that through-holes 6b for liquid passages be formed at least in the vicinity of the rotor shaft. In place of a disk-like plate, the rotor 6 may be formed of a combination of fan-like plates or radially extending plates or rods, which may further be bowed in shape in the direction of rotation. Thus, although not critical, the rotor 6 may be of such a shape that allows a liquid introduced along the shaft 3 to flow in the direction parallel to that shaft to distribute it uniformly on both sides of the rotor 6.

According to the present filter system contructed as detailed above, as the rotor 6 rotates in the primary chamber A surrounded by the filter media 5b and annular member 1g, a liquid contained in that chamber A is discharged from the outlet passage 1h formed in a part of the annular member 1g by centrifugal pumping and, at the same time, a fresh liquid is admitted therein from the inlet passage 1c. According to the filter system of the present invention, accordingly, a liquid feed is sucked only by coupling of the liquid feed inlet passage 1c to a pipe line extending from a liquid feed reservoir, and a filtrate is recovered from the filter media 5b through the filtrate outlet passage 1i and the space 1j, while a concentrated liquid is discharged from the outlet passage 1h. In this case, the concentrated liquid feed may be recycled to the liquid feed reservoir for re-filtration. In place of using the feed pump, a waterhead difference generated by locating the liquid feed reservoir at a position above the filter system may also be provided for pressurized filtration. Alternatively, reduced pressure may be applied to the space 1j for suction filtration. Still alternatively, the filter system may be installed in the reservoir. In addition, since such a rotor 6 is located adjacent to the surfaces of the filter media 5b for rotation, a liquid in the vicinity of the surfaces of the media 5b is fluidized so forcedly that a build-up of filter cakes may not possibly exceed a certain thickness. Thus, the present system can be continuously operated over an extended period, during which a filtration resistance does not exceed a certain value.

While the cross-flow type filter system of the present invention may be operable with a single set of filter units interposed between a pair of filter media, two or more sets of filter units may be connected with each other for use.

Figure 2:
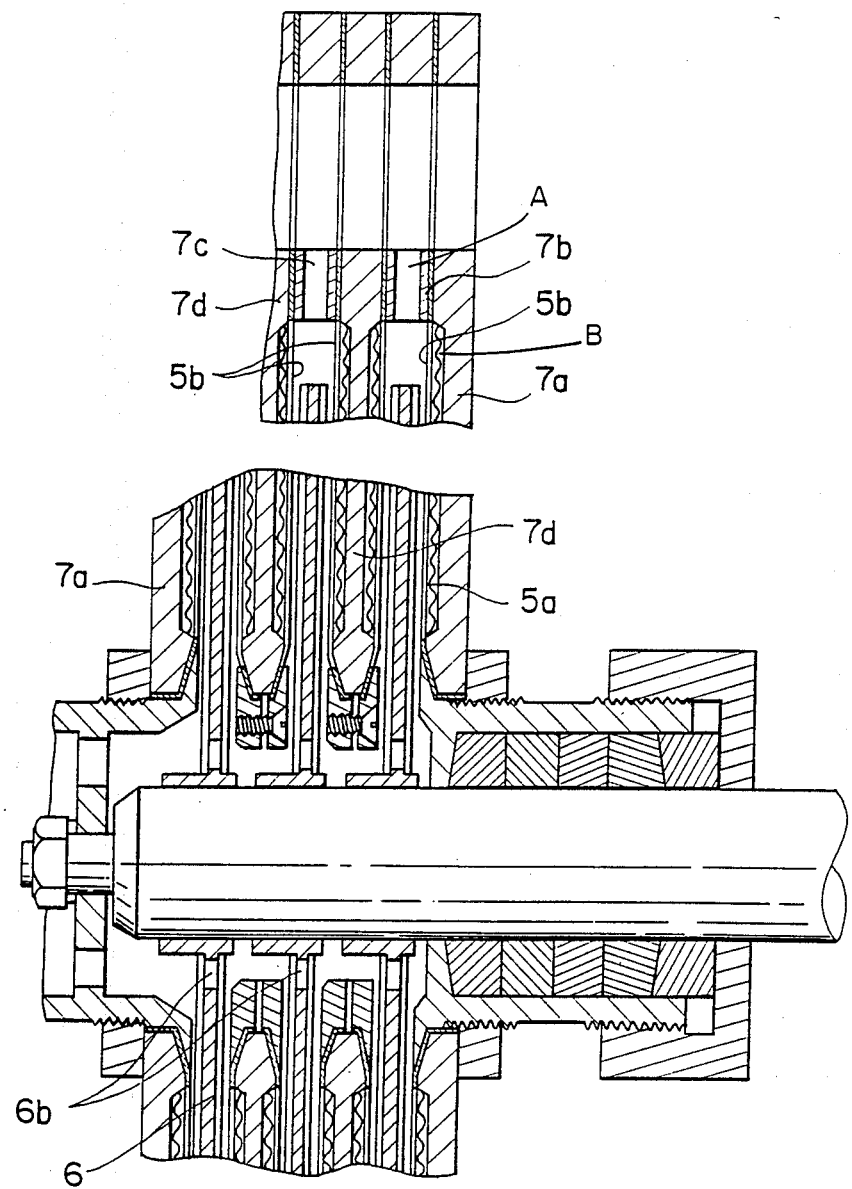
FIG. 2 is a partly, longitudinally sectioned view of another embodiment of the present invention.

When some sets of filter units are connected with each other, a filter body 7 may be constructed from a side wall member 7a, an annular member 7b and an intermediate wall member 7d in combination, as illustrated in FIG. 2 by way of example. In this case, the side wall member 7a is provided on one side alone with a support member 5a and filter media 5b to define a secondary chamber B, and the intermediate wall member 7d is provided on both its sides with the support member 5a and the filter media 5b to define the secondary chamber B. As is the case with the aforesaid embodiment, a primary chamber is defined between two facing filter media 5b and 5b and the annular member 7b. Rotors 6 are located in the associated primary chambers A, an liquid feed passes successively through through-holes 6b formed in the rotors 6 in the vicinity of rotor shafts and are fed into all the primary chambers A. Concentrated liquids fed out by the rotation of the rotors are collectively discharged through outlet passages 7c formed in the annular members 7b.

According to the cross-flow type filter system of the present invention, the primary and secondary chambers are defined by the partition for fixing a plurality of filter media in parallel, and the rotor is located in the primary chamber to obtain an accelerated flow of a liquid and limit a build-up of filter cakes. This leads to economical and operational advantages that any liquid feed pump can be dispensed with, and that the filter system per se is simplified, installed in a limited space and is easy to operate. In addition, the present filter system is characterized in that it can be continuously operated over an extend period, during which a build-up of filter cakes may not possibly exceed a certain limit, even though a suspension is concentrated.

While the present invention has been described with reference to the specific embodiments, it is understood that many modifications or changes may be made without departing from the scope as defined in the appended claims.

I claim:

1. A cross-flow type filter apparatus comprising:
    a filter body divided into at least one primary chamber and at least one pair of secondary chambers, each of said at least one primary chambers being positioned between and spaced apart from pair members of said at least one pair of secondary chambers by porous support means which support filter media;
    a disc shaped rotor positioned within each of said at least one primary chambers adjacent and parallel to facing surfaces of said filter media which are supported on pair members of said at least one pair of secondary chambers by said porous support means, sad rotor being rotatably mounted on a rotor shaft which extends through the center of said rotor, said rotor shaft extending perpendicular to said surfaces of said filter media, said rotor having through-holes therein adjacent said rotor shaft for allowing fluid to flow therethrough and in a direction parallel to said rotor shaft;
    feed inlet passage means located in a portion of said filter body which houses said rotor shaft, said feed inlet passage means being positioned adjacent one end of said rotor shaft and;
    fluid outlet passage means located on a peripheral surface of a portion of said filter body which houses said at least one primary chamber and said at least one pair of secondary chambers, both said inlet and outlet passage means being in fluid communication with each of said at least one primary chambers,
    said fluid inlet passage means, said fluid outlet passage means and said through-holes being positioned so that fluid entering said fluid inlet passage means flows radially outward from said rotor shaft in each of said at least one primary chambers and is substantially uniformly distributed to flow parallel to each filter media and out said fluid outlet passage means.

2. A filter apparatus according to claim 1, wherein said filter media are disc shaped.

3. A filter apparatus according to claim 1, wherein said rotor includes radial grooves or rib structures.

4. A filter apparatus according to claim 3, wherein said grooves or rib structures are involuted.

* * * * *